(12) United States Patent
Millar et al.

(10) Patent No.: US 12,154,194 B2
(45) Date of Patent: Nov. 26, 2024

(54) COHERENT OPTICAL SENSOR WITH SPARSE ILLUMINATION

(71) Applicant: Mitsubishi Electric Research Laboratories, Inc., Cambridge, MA (US)

(72) Inventors: David Millar, Lexington, MA (US); Okan Atalar, Stanford, CA (US); Keisuke Kojima, Weston, MA (US); Toshiaki Koike-Akino, Belmont, MA (US); Pu Wang, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 773 days.

(21) Appl. No.: 16/925,680

(22) Filed: Jul. 10, 2020

(65) Prior Publication Data

US 2022/0012926 A1    Jan. 13, 2022

(51) Int. Cl.
*G06T 11/00* (2006.01)
*G01B 9/02091* (2022.01)

(52) U.S. Cl.
CPC ........ *G06T 11/005* (2013.01); *G01B 9/02091* (2013.01); *G06T 2207/10081* (2013.01)

(58) Field of Classification Search
CPC ........ G06T 11/005; G06T 2207/10081; G01B 9/02091; G01B 9/02004; G01B 9/02005
See application file for complete search history.

(56) References Cited

U.S. PATENT DOCUMENTS

| | | | |
|---|---|---|---|
| 10,355,446 B1 * | 7/2019 | Ensher ................ | H01S 5/1092 |
| 2009/0087186 A1 * | 4/2009 | Holman ............... | H04B 10/508 |
| | | | 398/102 |
| 2010/0128979 A1 * | 5/2010 | Monaghan ............ | H04N 19/59 |
| | | | 382/166 |

(Continued)

FOREIGN PATENT DOCUMENTS

WO    WO-2020129284 A1 *  6/2020  ......... G01B 9/02005

*Primary Examiner* — Tarifur R Chowdhury
*Assistant Examiner* — Akbar H. Rizvi
(74) *Attorney, Agent, or Firm* — Gene Vinokur

(57) ABSTRACT

A method for a target image reconstruction is provided. The method includes emitting stepped frequency waveforms having different constant frequencies at different periods of time, modulating the stepped frequency waveforms into frequency ranges each having a first frequency and a second frequency, wherein each of the stepped frequency waveforms are increased from the first frequency to the second frequency based on a range function, wherein the modulated stepped frequency waveforms are arranged with some sparsity factor. The method further includes transmitting the modulated stepped frequency waveforms to a target and accepting reflection of the modulated stepped frequency waveforms reflected from the target interfering the modulated stepped frequency waveforms and the reflection of the modulated stepped frequency waveforms to produce beat signals of interferences between the modulated stepped frequency waveforms and the reflection of the modulated stepped frequency waveforms, and reconstructing an image of the target from the beat signals.

12 Claims, 15 Drawing Sheets

(56) References Cited

U.S. PATENT DOCUMENTS

| | | | | |
|---|---|---|---|---|
| 2010/0150422 A1* | 6/2010 | Vakoc | ............... | A61B 5/0066 382/131 |
| 2012/0320368 A1* | 12/2012 | Jiao | ............... | G01B 9/02091 356/72 |
| 2020/0333129 A1* | 10/2020 | Mohseni | ............ | G01B 9/02069 |

* cited by examiner

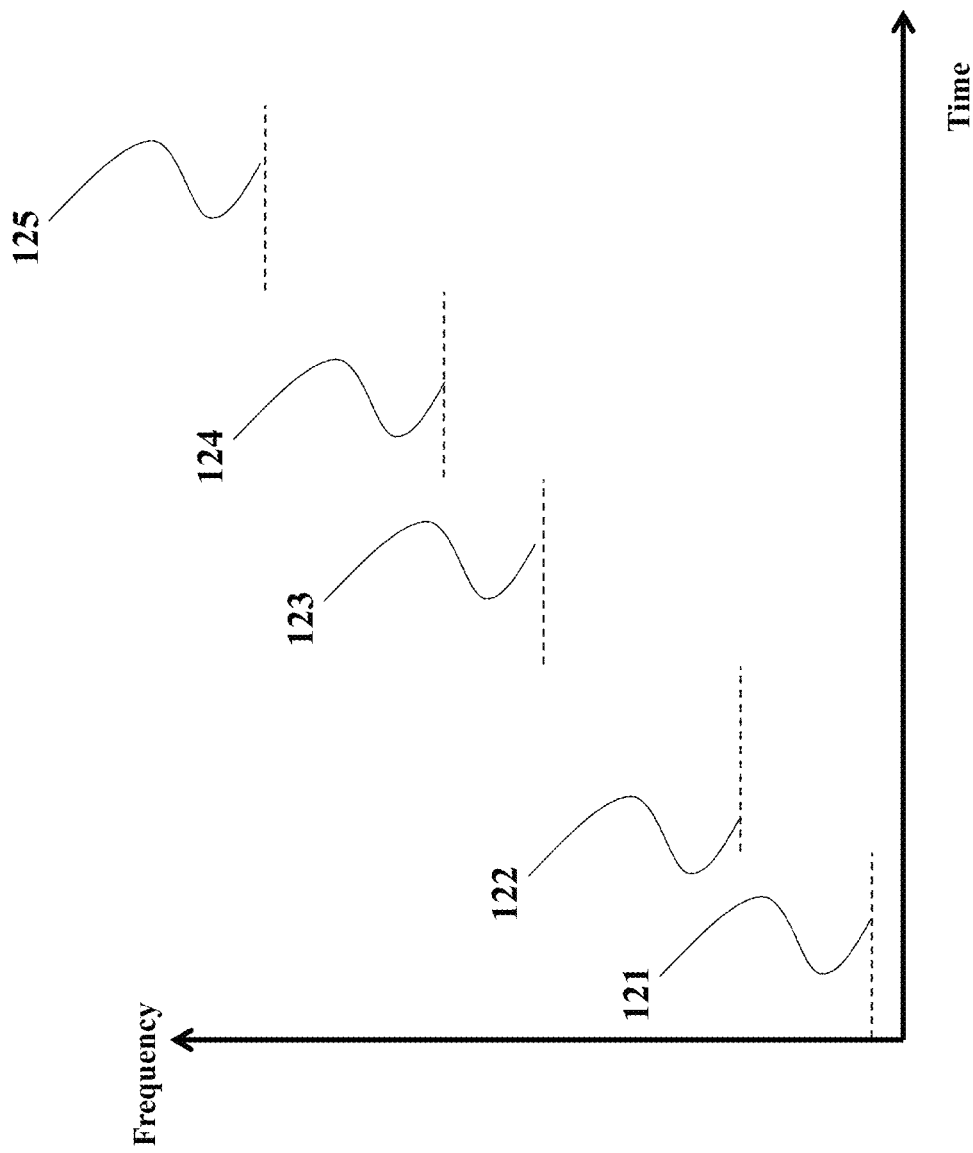

COHERENT OPTICAL SENSOR WITH SPARSE ILLUMINATION

TECHNICAL FIELD

This invention relates to generally to a coherent optical sensor, and more specifically to a coherent optical sensor with sparse illumination.

BACKGROUND & PRIOR ART

Coherent optical sensors are used for constructing 3-D images of objects for applications such as medical imaging, industrial imaging etc. An inherent limitation to these sensors is that their resolution is limited by the bandwidth of the source used to illuminate the object. Conventional sensors use either randomly varying high bandwidth sources combined with multiple detectors, or time-varying high bandwidth optical sources which sweep in the frequency domain, combined with a single receiver. Both of these solutions lead to high resolution, but have extremely high cost due to the complexity of manufacturing the detectors in the former case, and the source in the latter case. Problem: to reduce cost of coherent optical sensors.

Optical coherence tomography (OCT) is typically realized with high resolution using a swept-source laser. This laser is unfortunately an extremely expensive component, making OCT a prohibitively expensive technology for many applications. There is therefore a need to develop a system for coherent sensing that enables the use of cheaper optical sources.

SUMMARY

Some embodiments of the present disclosure are based on recognition that a combination of multiple low bandwidth source chirps can achieve a high bandwidth. By coherently combining the low bandwidth chirps, we can achieve performance equivalent to the high bandwidth system for sparse targets.

Some embodiments of the disclosure are based on the realization that by using single frequency optical sources (e.g. diode lasers), combined with phase modulation, a significant proportion of the desired illumination bandwidth may be covered, enabling sparse recovery of certain targets. Furthermore, the number of optical frequencies required for such a system may be, in some cases, few enough that all lasers and the modulation devices may be integrated into a single photonic integrated circuit (PIC). Avoiding nonlinear devices, mechanically swept component and other common features of conventional swept source lasers will be key enablers for avoiding the high cost of such swept sources.

According to some embodiments of the present disclosure, a coherent optical sensing system is realized with sparse illumination suitable for spatially sparse targets. It is found that performance is comparable to the conventional optical coherence tomography (OCT), while constraints on optical source performance can be greatly reduced. Since the bandwidth occupancy of the source can be reduced compared with the previously proposed stepped-frequency modulated coherent sensor (e.g. U.S. patent application Ser. No. 16/226,723), equivalent performance may be achieved with a significantly reduced number of unmodulated carriers, thus reducing the source cost. Alternatively, total bandwidth may be significantly extended, without increasing the number of unmodulated carriers, thus significantly improving on-axis resolution without increasing cost. As a result, improved sensors for industrial applications with sparse targets may be realized with greatly reduced cost.

It is an object of some embodiments to provide a sensor configured to reconstruct an image of a scene from a frequency modulated signal reflected from target(s) in the scene. Such an image is referred herein as a target image. It is an object of some embodiments to provide such a sensor that uses a functionality of linearly swept sources that emit linearly swept waveforms in a frequency domain without cost of manufacturing the ideal linearly swept sources and/or imperfection caused by non-linearity in practical implementation of current linearly swept sources. It is an object of some embodiments to increase bandwidth of such swept sources without the high increase of cost of manufacturing typically associated with high bandwidth swept sources.

On one hand, these objectives seem too optimistic. However, some embodiments aim to replace a linear swept source with a stepped frequency swept source, because stepped frequency swept source can cover virtually arbitrarily high bandwidth either without any cost increase associated with increase of the bandwidth or with moderate cost increase. However, in order to use a stepped frequency swept source in frequency modulated image reconstruction, some embodiments overcome a number of challenges.

Some embodiments are based on understanding that a stepped frequency swept source by itself is not suitable for frequency modulated image reconstruction. A stepped frequency swept source emits waveform having different constant frequencies at different periods of time, but only a single frequency for each period of time. In essence, a waveform emitted by a stepped frequency swept source is a stepped frequency waveform that can be represented by a stepped function, which is a piecewise constant function having only finitely many pieces. Because of these properties, only a small number of frequencies in the covered bandwidth are defined (have values), which degrade the image reconstruction.

Further, according to some embodiments of the present disclosure, a method for a target image reconstruction is provided. The method may include emitting stepped frequency waveforms having different constant frequencies at different periods of time; modulating the stepped frequency waveforms into frequency ranges each having a first frequency and a second frequency, wherein each of the stepped frequency waveforms is increased from the first frequency to the second frequency based on a range function, wherein the modulated stepped frequency waveforms are arranged with some sparsity factor; transmitting the modulated stepped frequency waveforms to a target and accepting reflection of the modulated stepped frequency waveforms reflected from the target; interfering the modulated stepped frequency waveforms and the reflection of the modulated stepped frequency waveforms to produce beat signals of interferences between the modulated stepped frequency waveforms and the reflection of the modulated stepped frequency waveforms; and reconstructing an image of the target from the beat signals.

Yet, further, some embodiments of the present disclosure provide a system for a target image reconstruction. In this case, the system may include a stepped frequency transmitter configured to emit stepped frequency waveforms having different constant frequencies at different periods of time; a modulator configured to modulate the stepped frequency waveforms into frequency ranges, each of the stepped frequency waveforms having a first frequency and a second frequency, wherein each of the stepped frequency waveforms is increased from the first frequency to the second frequency based on a range function, wherein the modulated stepped frequency waveforms are arranged by a sparsity factor at the different periods of time; a transceiver configured to transmit the modulated stepped frequency waveforms to a target and accepting reflection of the modulated stepped frequency waveforms reflected from the target; a mixer configured to interfere the modulated stepped frequency waveforms and the reflection of the modulated stepped frequency waveforms to produce beat signals of interferences between the modulated stepped frequency waveforms and the reflection of the modulated stepped frequency waveforms; and a signal processor configured reconstruct an image of the target from the beat signals.

BRIEF DESCRIPTION OF FIGURES

The presently disclosed embodiments will be further explained with reference to the attached drawings. The drawings shown are not necessarily to scale, with emphasis instead generally being placed upon illustrating the principles of the presently disclosed embodiments.

FIG. 1B shows a schematic of frequency against time for a stepped frequency source, according to some embodiments of the present disclosure;

Figure 1A:
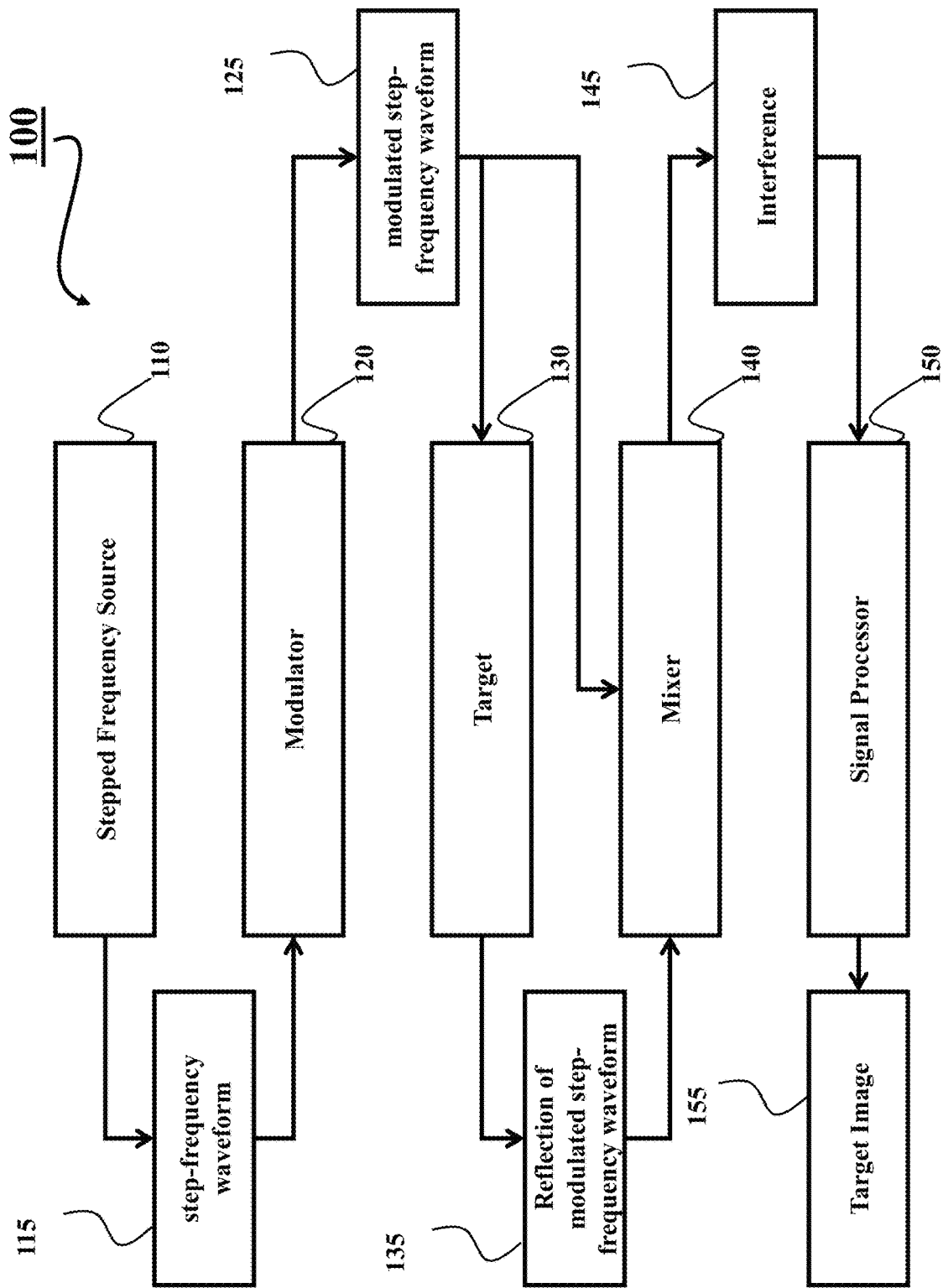
FIG. 1A shows a schematic of a spectrally sparse coherent sensing system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF FIGURES

Various embodiments of the present disclosure are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Some embodiments of the present disclosure are based on recognition that a spectrally sparse coherent sensing system can be configured to perform a method that includes steps of emitting stepped frequency waveforms having different constant frequencies at different periods of time, modulating the stepped frequency waveforms into frequency ranges each having a first frequency and a second frequency. In this case, each of the stepped frequency waveforms is increased from the first frequency to the second frequency based on a range function, wherein the modulated stepped frequency waveforms are arranged by a sparsity factor at the different periods of time. The method further includes steps of transmitting the modulated stepped frequency waveforms to a target and accepting reflection of the modulated stepped frequency waveforms reflected from the target, interfering the modulated stepped frequency waveforms and the reflection of the modulated stepped frequency waveforms to produce beat signals of interferences between the modulated stepped frequency waveforms and the reflection of the modulated stepped frequency waveforms, and reconstructing an image of the target from the beat signal.

The range of targets can be estimated by linearly chirping the frequency a light source, and interfering the returned light after reflecting from the target with itself. The distance of the target is proportional to the beat frequency due to interference of the two beams. The linear chirp image domain is usually achieved by taking the Fast Fourier transform of the time-domain signal, and taking the magnitude. The covered B is inversely proportional to the attainable resolution $\Delta z$, and using Abbe resolution criteria, this can be quantified as $$\Delta z = \frac{c}{2B},$$

where c is the speed of light in air. To retain the spatial resolution, while reducing the scanned bandwidth, a linear stepped chirp can be used, where a constant frequency difference is used between chirps, and each low resolution image reconstructed through FFT. A high resolution image then obtained by multiplying each with the right phase, summing, then taking magnitude. However, in this case, the unambiguous imaging range $R_U$ is now limited by the spacing between the chirps $$R_U = \frac{c}{2\Delta f},$$

where $\Delta f$ is the linear spacing between chirps. Therefore, in order to achieve high resolution while also keeping bandwidth occupancy low, the unambiguous range needs to be small, making it poorly suited for many applications. Random spacing between chirps may also be used, with linear reconstruction as previously described for linear stepped chirps. In this case, reconstruction can benefit from the fast processing time of FFT, while the unambiguous range $R_U$ is now only limited by the sampling rate of the detector as $$R_U = \frac{f_s}{4s},$$

where $f_s$ is the sampling rate of detector, and so is the chirp rate. The main limitation of this approach, are side lobes in the reconstructed image. The smaller the occupation bandwidth, the larger the side lobes, thus providing noise and distortion in the image domain, since side-lobes appear just like targets. It should be noted that while a low BW chirp can be used for ranging with matched filtering, this does not allow two closely spaced targets to be imaged simultaneously.

To avoid the trade-off between unambiguous range and imaging resolution, randomly spaced stepped frequency chirps may be used. The randomness is pseudo-random, and selected before imaging is performed. For a linear chirp, the resolution is determined by $$\Delta z = \frac{c}{2B},$$

and the unambiguous range as $$R_U = \frac{c}{2\Delta f},$$

where $\Delta f$ is the frequency spacing between the chirps. Each received waveform has a constant term, and a single frequency with AWGN. Without assuming prior information about the scene, the reconstruction is performed through matched-filtering. One metric used to evaluate resolution accuracy can be peak-to-max-sidelobe ratio. This metric is used as it has an easy analytic form, and is related to the probability of error (within a probabilistic framework). Basic thresholding of the peaks can be used to determine the number of targets present within the imaged region. A basic probabilistic framework to estimate the probability of error for misdetection may be given as follows.

The reconstructed image for a single low bandwidth chirp with index i is given by $$I_i(t) = DC + \cos\left(\frac{4\pi\Delta L}{c}\left(f_i + \frac{\Delta rt}{T} - \frac{\Delta r}{2}\right)\right) \quad (1)$$

and the reconstructed high resolution image is therefore given by $$\hat{I}(d) = \left|\sum_{n=1}^{L} I_i\left(f = \frac{2ds}{c}\right)\exp\left(-\frac{j4\pi f_i d}{c}\right)\right| \quad (2)$$

This leads to a peak-to-maximum-sidelobe ratio:

$$PMSBR = \frac{Lk}{L\left[1 - e^{-L} - \int_0^L (1 - e^{-x^2/L})dx\right]^n} \quad (3)$$

FIG. 1A shows a schematic of a spectrally sparse coherent sensing system 100, according to some embodiments of the present disclosure. The system 100 is configured to reconstruct an image of a scene from a frequency modulated signal reflected from target(s) in the scene. The system 100 uses a stepped frequency source 110. Such an image is referred herein as a target image.

The stepped frequency source 110 is configured to generate a stepped frequency waveform 115 which is then sent to a modulator 120. The modulator 120 is configured to produce a modulated step-frequency waveform 125. The modulated step-frequency waveform 125 is provided to a target 130 and a mixer 140, and a reflection of the modulated waveform 135 is produced from the target 130. This reflection is then mixed in the mixer 140 with the modulated step-frequency waveform 125 to produce an interference 145 which is then processed in a signal processor 150. The signal processor 150 is configured to produce a target image 155.

FIG. 1B shows a schematic of frequency against time for a stepped frequency source 110, according to some embodiments of the present disclosure. The stepped frequency source 110 is configured to generate/transmit individual frequencies 121, 122, 123, 124 and 125 sequentially. In this case, the frequencies do not include overlap. Some embodiments are based on the realization that a spatially sparse target may be completely and accurately sensed with only a sparse illumination spectrum given appropriate image reconstruction techniques. Further, the emitted illumination stepped frequency waveforms 121, 122, 123, 124 and 125 are different constant frequencies at different periods of time, and the stepped frequency waveforms 121, 122, 123, 124 and 125 are modulated on frequency ranges. In this case, each of the frequency ranges has a first frequency and a second frequency, and each of the stepped frequency waveforms is increased from the first frequency to the second frequency based on a range function. In some cases, the range function may be a linear function (i.e. a chirp) as a function of time. Further, the modulated stepped frequency waveforms 121, 122, 123, 124 and 125 are arranged with some sparsity factor.

Some embodiments of this invention are based on the realization that a stepped frequency source (or stepped chirp light source) 110 with a modulator 120 and modulation signal may be of significantly lower cost than a continuously swept source of equal bandwidth, while providing equivalent performance for spatially sparse targets. An optical system containing several discrete lasers acting as a stepped frequency source 110, and a modulator 120 to provide some expansion of bandwidth may be implemented without any physically moving components, and on a single photonic integrated circuit. This in turn enables the use of modern semiconductor manufacturing, processing and packaging techniques, and a significant reduction in cost compared with conventional devices which require extensive mechanical assembly, alignment and calibration.

In some embodiments, the stepped frequency source 110 may be realized by connecting multiple single frequency lasers and multiplexing with a phase modulator. The detector sampling rate may be between approximately 100 MHz and 1 GHz. For instance, the sampling rate may be 400 MHz, the chirp rate may be between approximately $10^{16}$ Hz/s and approximately $10^{17}$ Hz/s. The chirp band width may be between approximately 10 GHz and 50 GHz. In some case, the chirp band width may be 15 GHz. The image reconstruction may be performed using the magnitude of the Fourier Transform of the received waveform.

In general, the modulator 120 is a device configured to modulate an incoming signal. For example, some embodiments use a Mach-Zehnder modulator (MZM) which is an optical device in which a signal-controlled element exhibiting the electro-optic effect is used to modulate a beam of light. In one embodiment, the modulation is imposed on the phase and/or amplitude of the beam. Modulation bandwidths of tens of gigahertz are possible with Mach-Zehnder modulators.

In one embodiment, the stepped frequency waveform has a constant height for each step, such that the difference between any two neighboring frequencies is constant. In this embodiment, a single modulator configured to spread a constant frequency over a range defined by the step of the stepped frequency waveform can modulate the entire stepped frequency waveform to occupy the entire bandwidth. In such a manner, a single stepped frequency swept source (which can be implemented with multiple constant frequency sources) and a single modulator can produce a modulated signal that covers virtually arbitrarily large bandwidth 134.

Figure 1C:
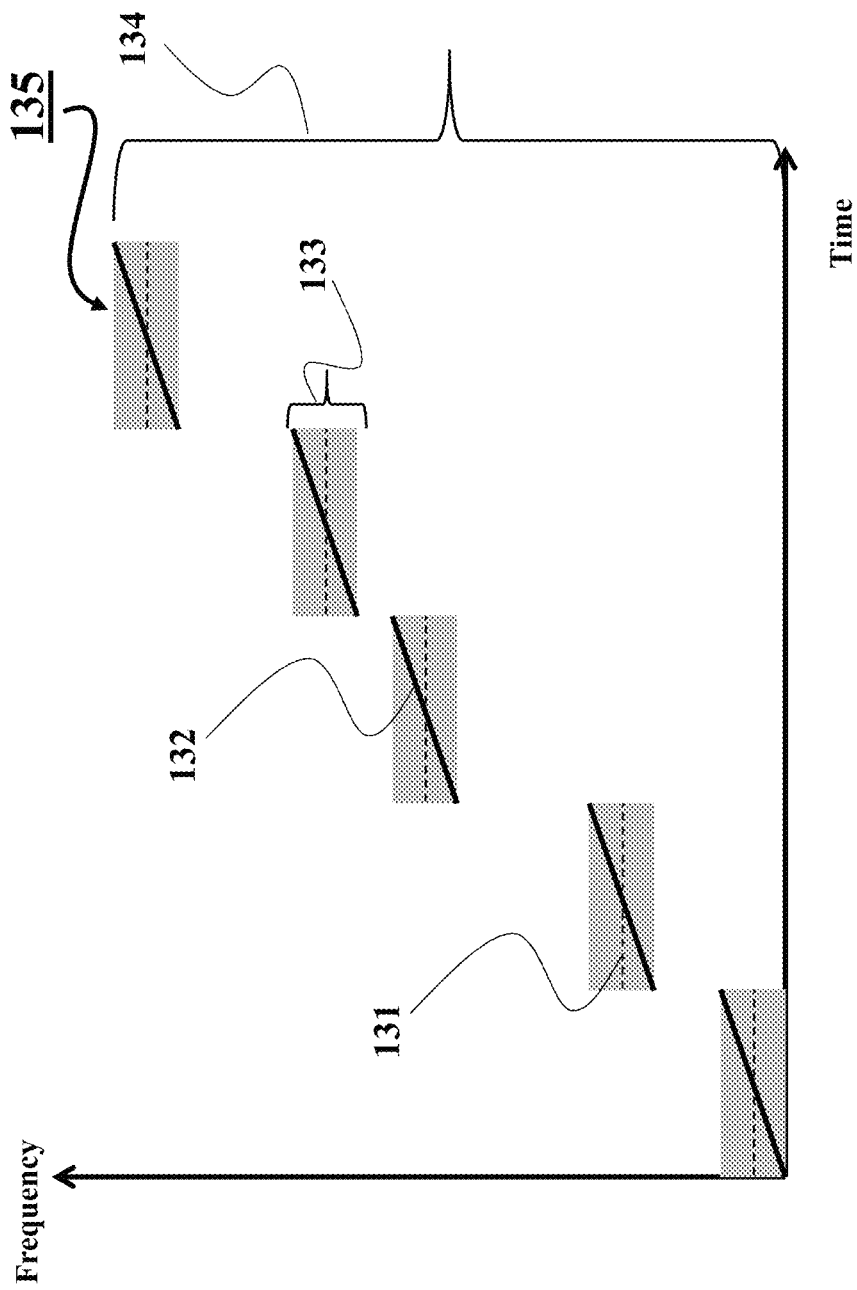
FIG. 1C shows a schematic of frequency against time for a stepped frequency source after modulation, according to embodiments of the present disclosure.

FIG. 1C shows a schematic of frequency against time for a stepped frequency source after modulation 135. Individual frequencies 131 are modulated to provide an expanded bandwidth 133. Modulation may be optionally performed such that frequency is constantly and linearly increasing with time 132 to produce a linear chirp. A total measurement bandwidth 134 is defined as the difference between the maximum and minimum frequencies over the entire modulated waveform 135. We may define the sparsity factor as the number of wavelengths multiplied by the bandwidth per wavelength, divided by the total measurement bandwidth. For instance, the sparsity factor may be determined such that a sum of the frequency ranges is less than a total bandwidth over a measurement of the target.

Figure 1D:
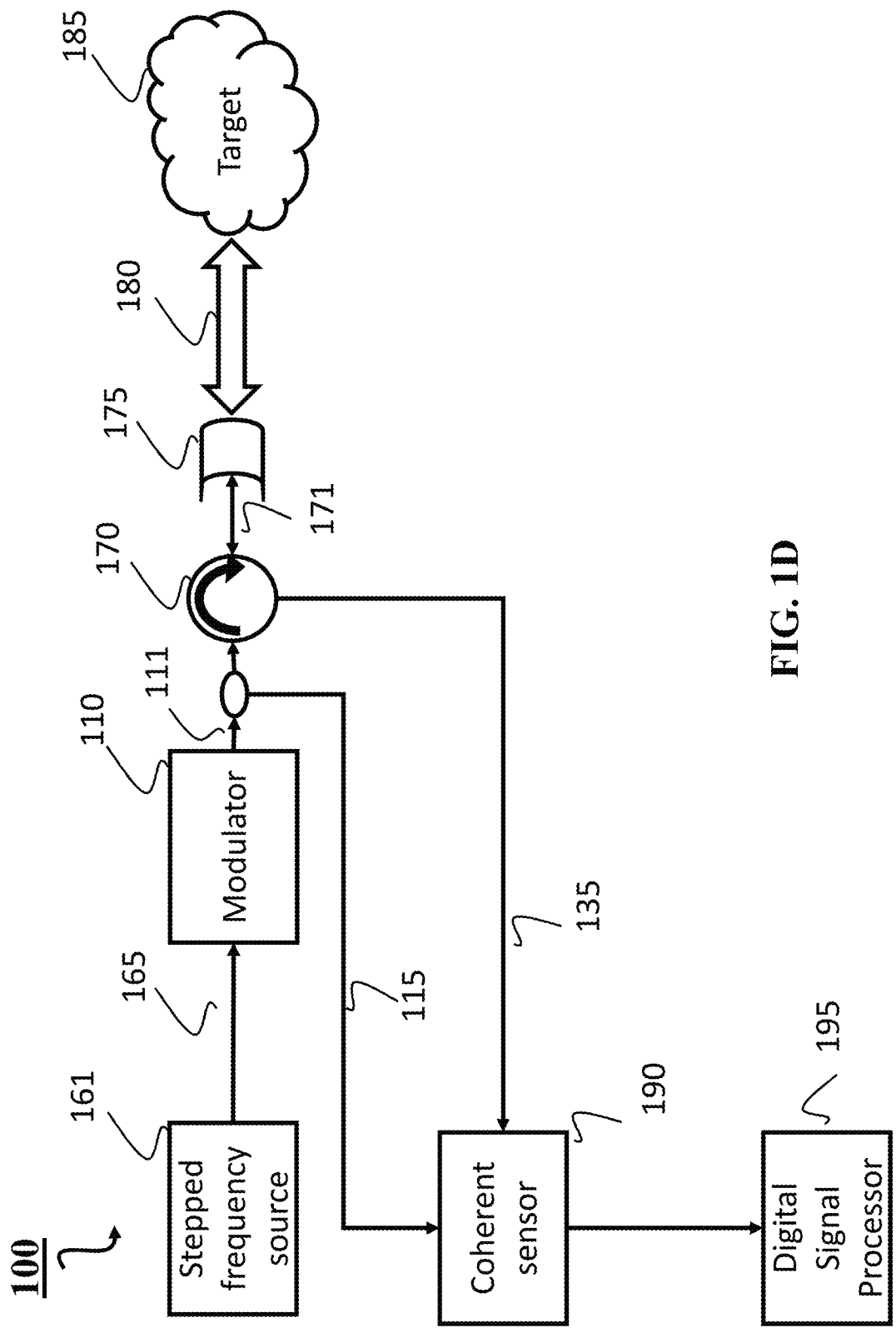
FIG. 1D shows an exemplar schematic of a sparse illumination coherent sensor according to some embodiments of the invention.

FIG. 1D shows an exemplar schematic of a sparse illumination coherent sensor (system) 100 according to some embodiments of the invention. The sparse illumination coherent sensor 100 may include a stepped frequency source 161, a modulator 110, a circulator 170, a lens or antenna 175, a digital signal processor 195, and a coherent sensor 190. The stepped frequency source 161 sends a waveform 165 to the modulator 110. The modulated waveform 111 is then sent to the circulator 170, which is then sent to the lens or antenna 175 which then transmits the waveform 180 to a target 185. The reflection is then collected by the lens or antenna 175, before passing through the circulator 170. The reflected signal 135 is then mixed with a portion of the modulated waveform 115 in the coherent sensor 190 before being processed in the digital signal processor 195.

In some cases, the circulator 170 is a passive non-reciprocal three- or four-port device, in which a microwave or radio frequency signal entering any port is transmitted to the next port in rotation. In one implementation, the circulator 170 is a 3-port circulator designed such that a signal entering any port exits from the next. This means that if signal enters port 1 it is emitted from port 2, but if some of the emitted signal is reflected back to the circulator, it does not come out of port 1 but instead exits from port 3. In embodiments using optical signals, e.g. using lasers as a stepped frequency source 161, the circulator 170 is an optical circulator.

According to an embodiment of the present disclosure, the modulated waveform emitted from the second port of the circulator 170 is sent to the lens or antenna 175. Imaging head is a device that provides for the coupling of light into and out of the sensor, and directing the light onto a target. The modulated waveform is then sent over the free-space channel 180 to the target 185. The reflection from the target is then gathered by the lens or antenna 175, before being transmitted between ports 2 and 3 of the circulator 170. The reflected signal 135 is then mixed with the unmodulated stepped-frequency waveform 115 in a mixer 190, before being processed by the signal processor 150. In some cases, the signal processor 150 may be a digital signal processor 195.

Figure 2A:
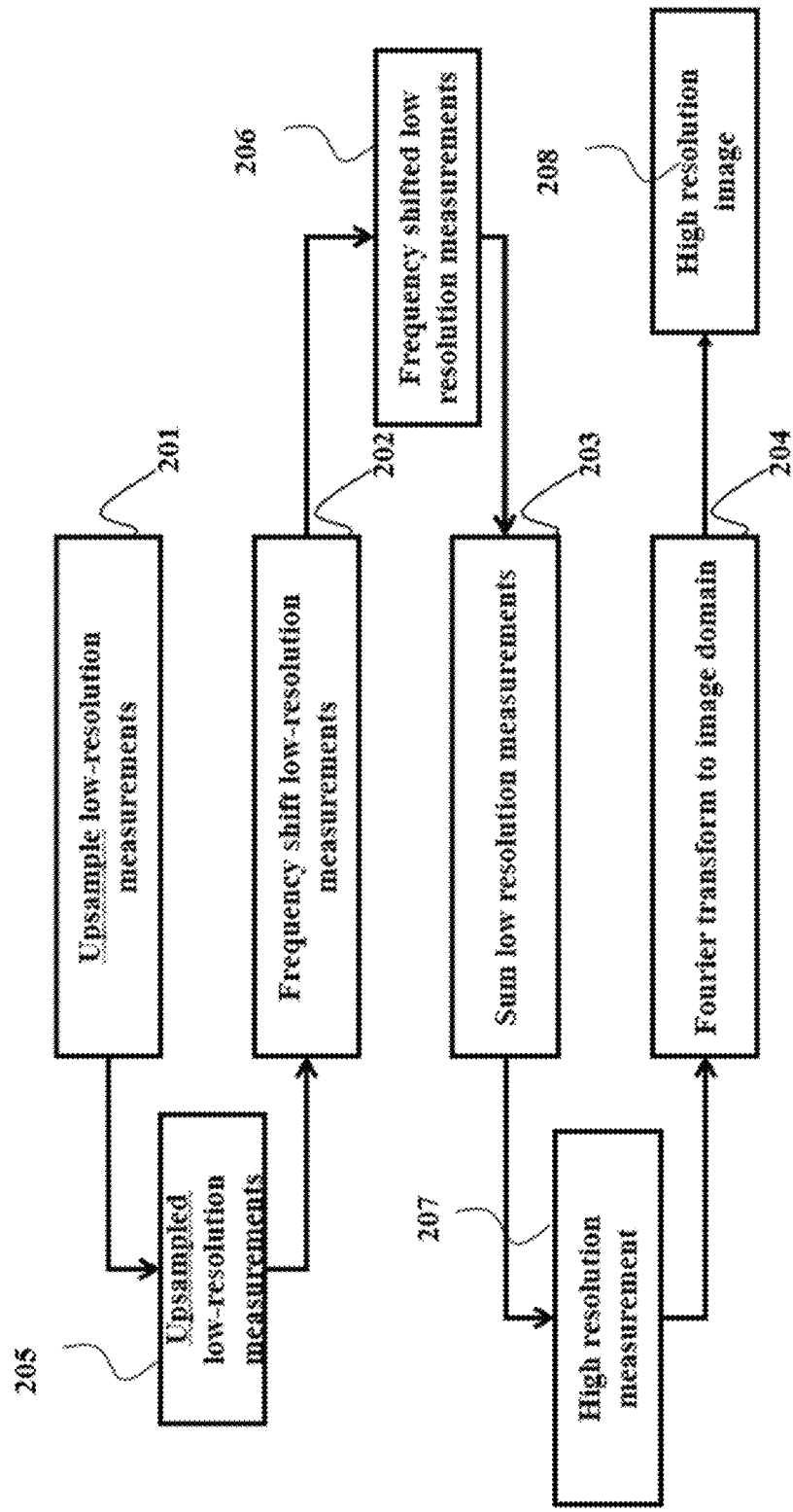
FIG. 2A shows a schematic of the procedure for reconstructing a high resolution image from a series of low resolution measurements.

FIG. 2A shows a schematic of the procedure for reconstructing a high resolution image from a series of low resolution measurements using the system 100, each corresponding to a measurement over a single stepped frequency with bandwidth equal to that of the modulation. Low bandwidth measurements are upsamples 201 to provide a set of upsampled low-resolution measurements 205. The measurements then undergo a frequency shift corresponding to their relative frequency of their respective stepped frequencies 202 to produce a set of frequency shifted measurements 206. The low resolution measurements are then summed 203 to produce a single high-resolution measurement 207. This high resolution measurement 207 then undergoes a Fourier transform 204 to produce a high-resolution image 208.

Figure 2B:
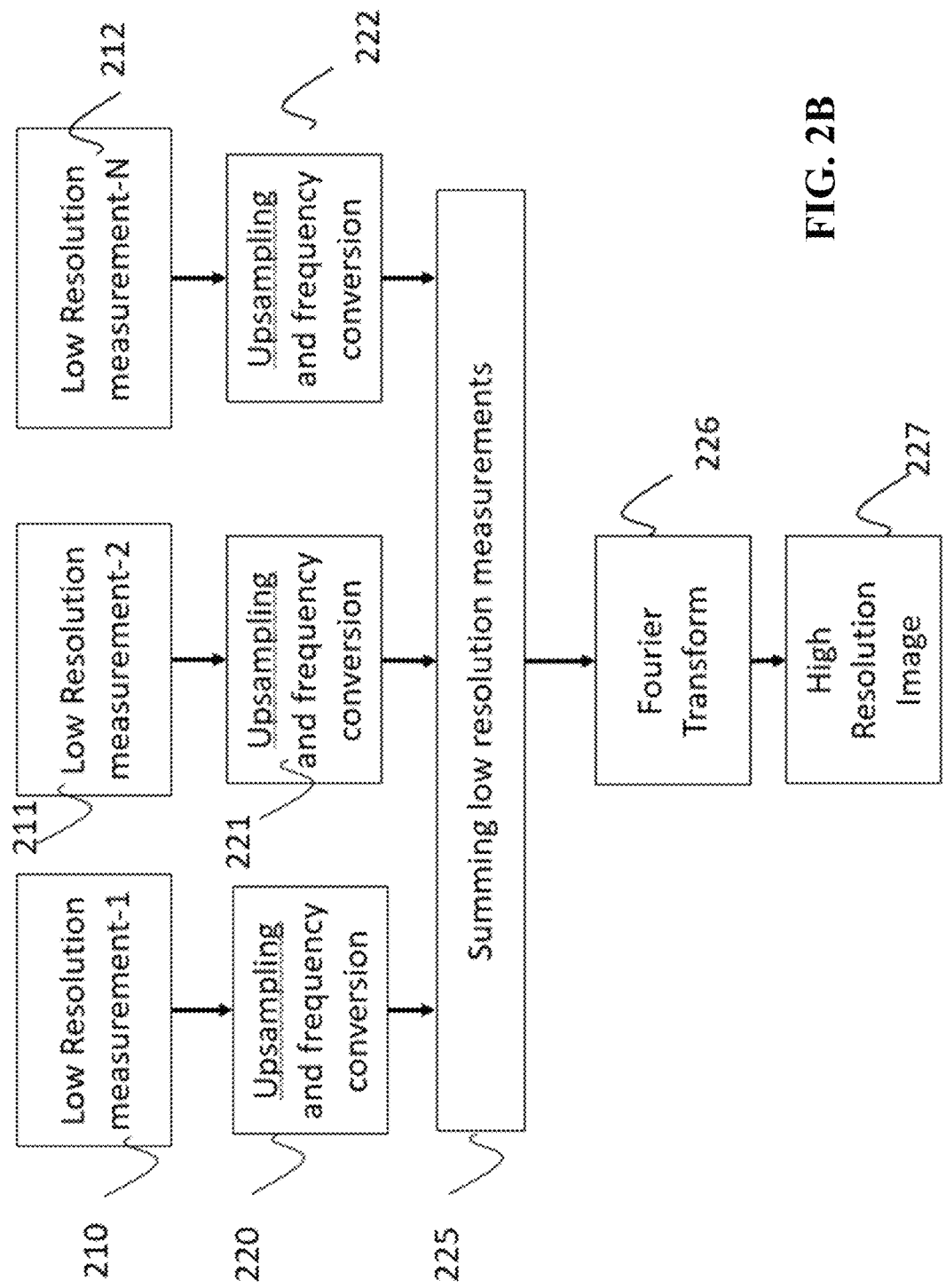
FIG. 2B shows an example signal flow for reconstructing a high resolution image from many low resolution measurements, according to embodiments of the present disclosure.

FIG. 2B shows an example signal flow for reconstructing a high resolution image from many low resolution measurements according to some embodiments of the present disclosure. According to some embodiments of this invention, the low resolution measurements correspond to spectra of low resolution images. Several low-resolution measurements 210, 211, 212 are upsampled, and frequency converted 220, 221, 222 according to the relative frequencies of the corresponding stepped frequency source frequencies. These manipulated low resolution measurements are then summed 225, before undergoing a Fourier transform 226 to produce a high resolution image 227.

Figure 2C:
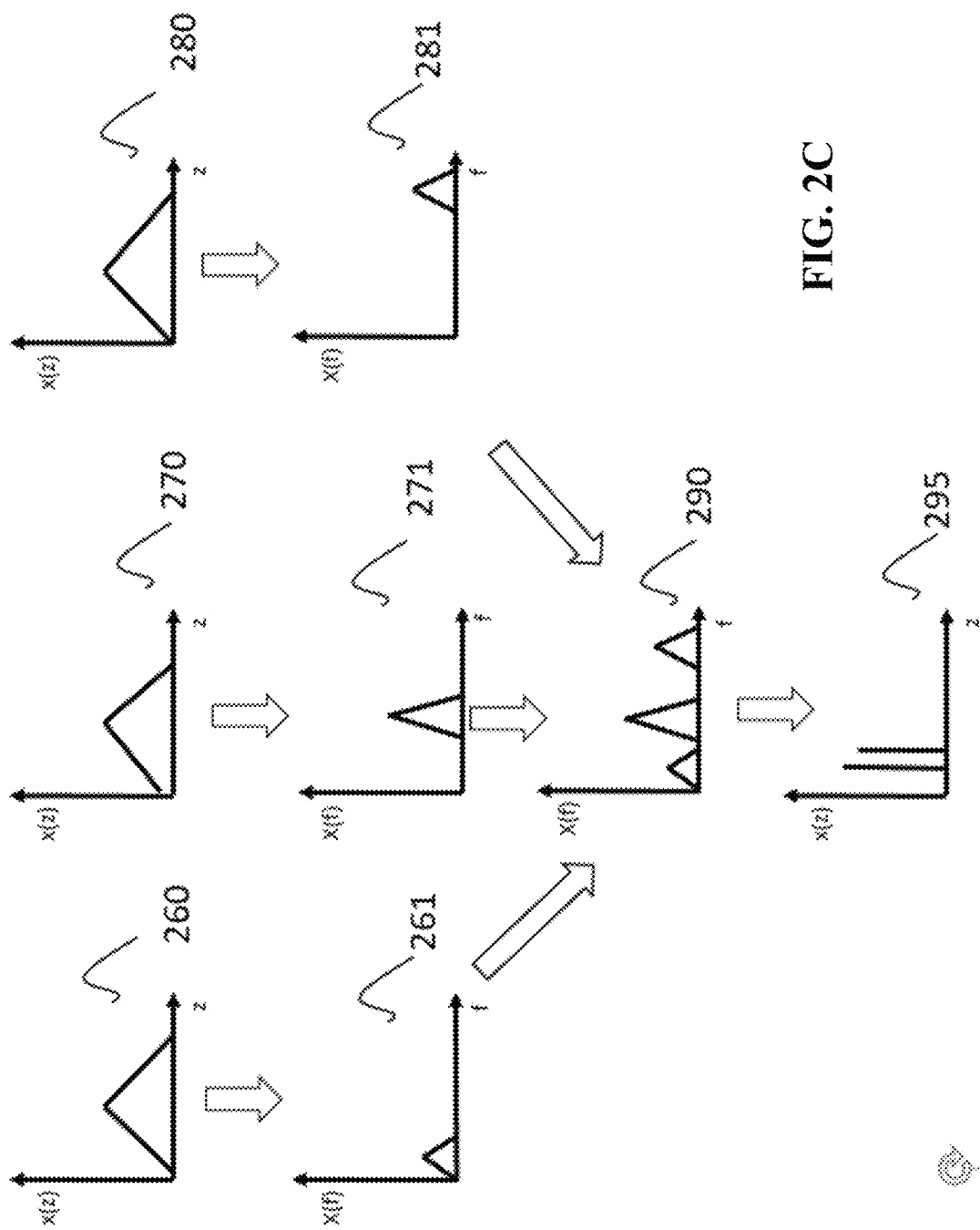
FIG. 2C shows an exemplar set of low resolution measurements being processed to produce a high resolution image according to some embodiments of the invention.

FIG. 2C shows an exemplar set of low resolution measurements being processed to produce a high resolution image according to some embodiments of the invention. In this case, the reconstructing images may be performed by including steps of using a low-bandwidth measurement from each step frequency of the unmodulated waveform to produce a set of low-bandwidth measurements, increasing the sampling rate of each of the set of low-bandwidth measurements by zero padding in the frequency domain to produce a set of oversampled measurements, applying frequency shifts to each of the low-bandwidth measurements corresponding to their relative optical frequencies, to produce a set of frequency shifted measurements, summing the frequency shifted measurements to produce a single high-bandwidth measurement, and transforming the high-bandwidth measurement with a Fourier transform to produce a target image. In this case a resolution of the target image may be greater than resolution of each of the low-resolution images.

For instance, several low-resolution measurements 260, 270, 280 may be upsampled in the frequency domain either for a small section of a measurement, or an entire axial measurement, and frequency converted 261, 271, 281 according to the relative frequencies of the corresponding stepped frequency source frequencies. These manipulated low resolution measurements are then summed 290, before undergoing a Fourier transform to produce a high resolution image 295.

Some embodiments are based on another realization that the knowledge of parameters of modulation can be useful for target image reconstruction. Examples of parameters of modulation include the modulation signal, the system impulse response, and a modulation sequence timing denoting the relative phase of the modulation sequence relative to the measurement apparatus. Specifically, a waveform reflected from a target is affected by a number of processes including processes of interest and ancillary processes. The process of interest is a reflection from the target image. This process affects the waveform in a manner allowing reconstructing the target image. The ancillary processes include a manner of generation of the waveform and modulation of the waveform. The effect of generation is reduced by interfering the reflection of the modulated step frequency waveform and the original and unmodulated step frequency waveform. However, there is also a need to consider the effects of modulation during the target image reconstruction.

Parameters of modulations have different principles than the principles of propagation of processed waveforms. Hence, it can be difficult to consider those parameters directly in the target image reconstruction. However, some embodiments are based on realization that one way to consider the modulation in target image reconstruction is by having a reference signal indicative of interference of unmodulated and modulated step frequency waveforms allowing to receive the parameters of modulation in a form similar to the form of the process waveforms. This reference signal can help to separate effects of modulation on the reflection of the modulated stepped frequency waveform.

Further, a system according to embodiments of the present disclosure by be performed by including steps of generating a reference signal indicative of interference of the unmodulated step frequency waveform and the modulated step frequency waveform and reconstructing the target image using the beat signal and the reference signal. In some case, the reconstructing step may include steps of cross-correlating the beat signal and the reference signal in a frequency domain for each constant frequency of the unmodulated step frequency waveform to produce correlation signals, such that there is one correlation signal for each constant frequency, combining the correlation signals in the frequency domain in an order of their respective frequencies to produce a frequency image of the target in the frequency domain, and transforming the frequency image using a Fourier transform to produce the target image. Furthermore, the interfering is performed in a digital domain.

Figure 3:
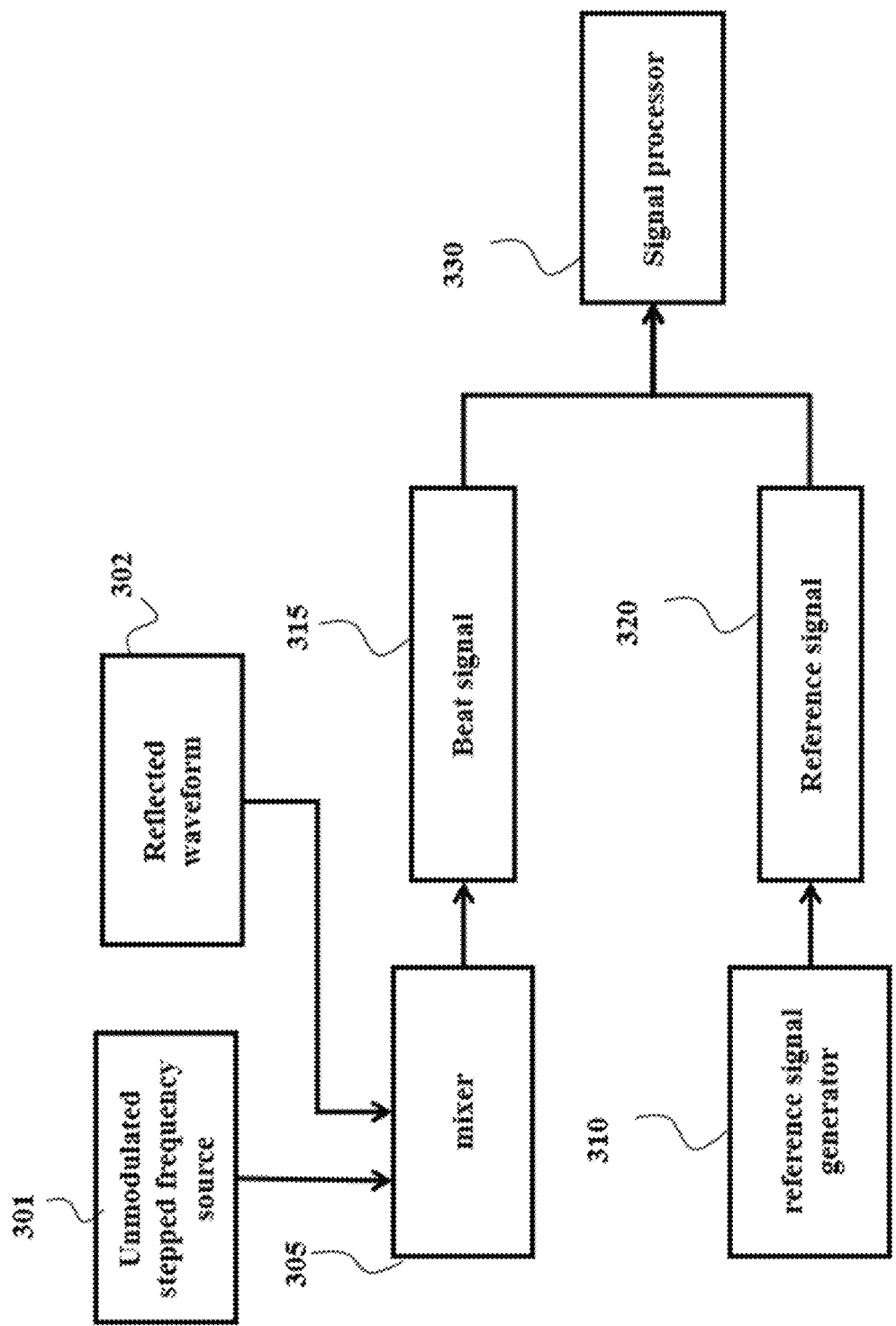
FIG. 3 shows a schematic of a system, illustrating that a reflected waveform is mixed with an unmodulated stepped frequency source in a mixer, according to embodiments of the present disclosure.

FIG. 3 shows an example schematic illustrating a system according to some embodiments of the present disclosure. In this case, a reflected waveform 302 is mixed with an unmodulated stepped frequency source 301 in a mixer 305. The resulting beat signal 315 is sent to a signal processor 330, along with a reference signal 320 which is generated in a reference signal generator 310.

Some of the embodiments of this invention are based on the realization that while image reconstruction requires the deconvolution of the transmitted modulated waveform and the received waveform, this may be done without penalty in the digital domain. Furthermore, some embodiments of this invention are based on the realization that if the reflected waveform is mixed with the stepped frequency waveform to form the beat signal, and the modulated waveform is mixed with the stepped frequency source to form the reference signal, the modulation signal may be any waveform with the required bandwidth and equal power in all frequency components.

Figure 4A:
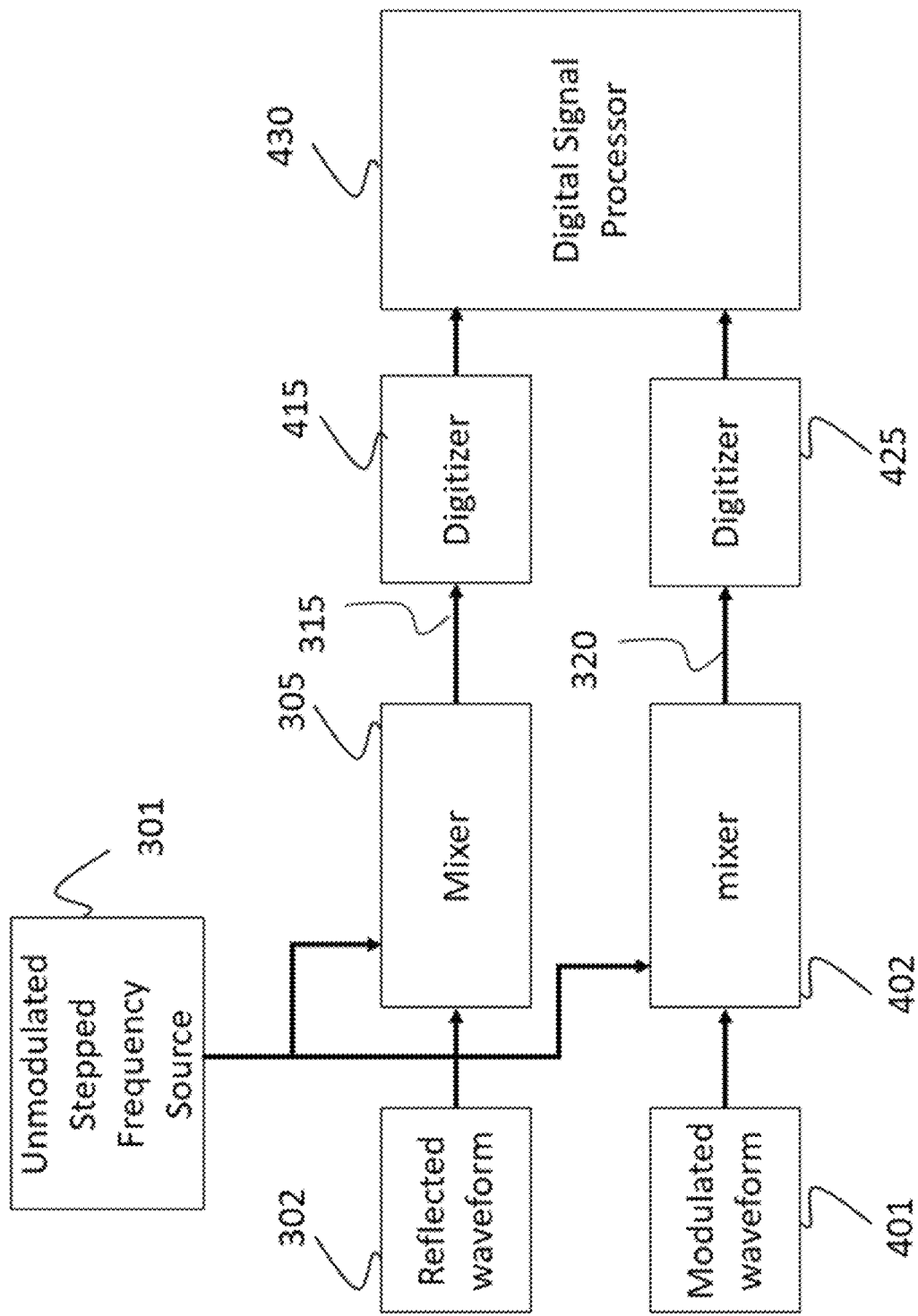
FIG. 4A shows an example system whereby a reference signal is generated by mixing a modulated waveform with an unmodulated stepped frequency source, according to embodiments of the present disclosure.

FIG. 4A shows an example system whereby a reference signal is generated by mixing a modulated waveform with an unmodulated stepped frequency source. A reflected waveform 302 is mixed in a mixer 305 with an unmodulated stepped frequency source 301. The resulting beat signal 315 is then digitized in a digitizer 415, before being sent to a digital signal processor 430. Simultaneously, a modulated waveform 401 is mixed in a mixer 402 with an unmodulated stepped frequency source 301. The resulting reference signal 320 is then digitized in a digitizer 425 before being sent to the digital signal processor 430.

Figure 4B:
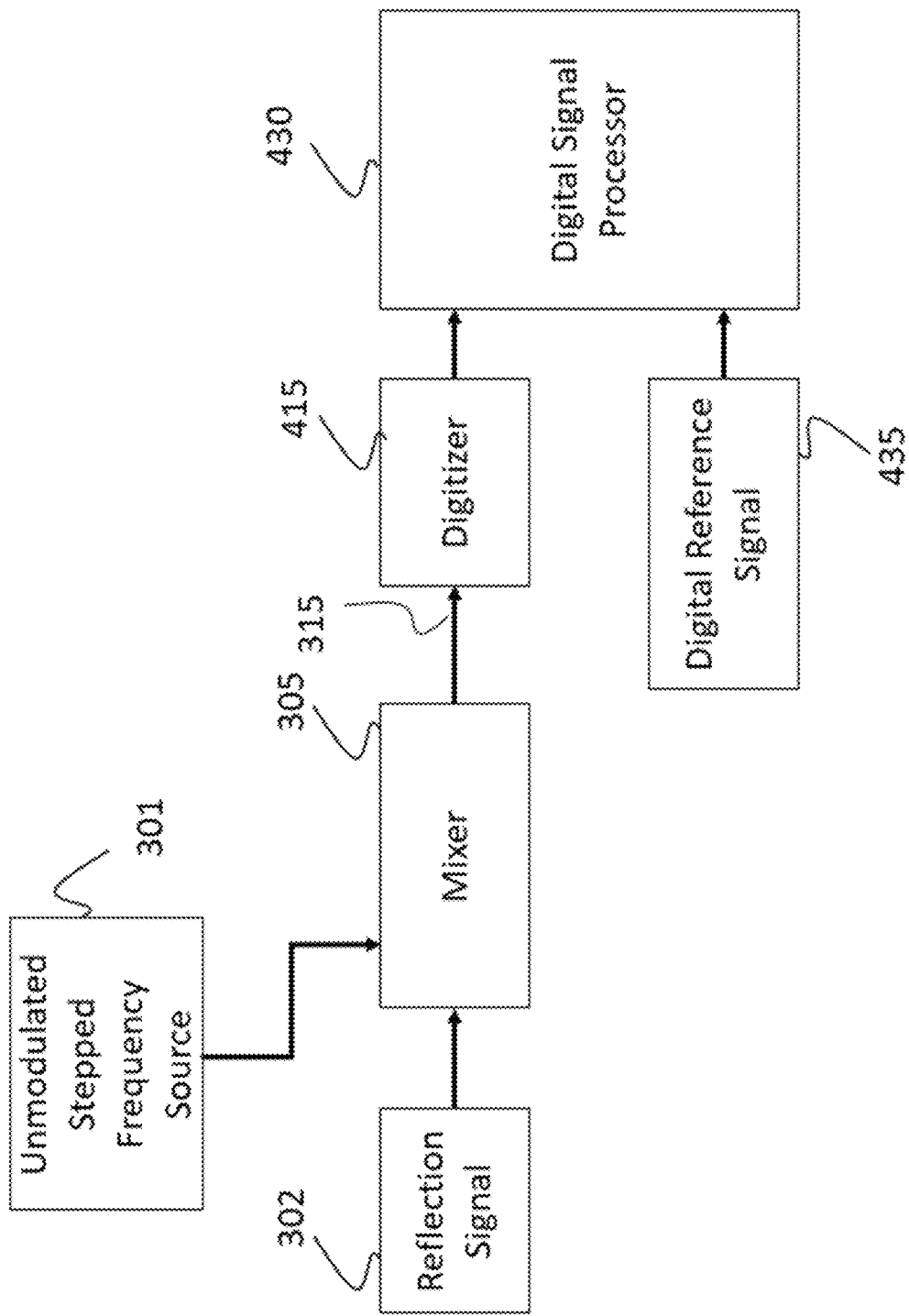
FIG. 4B shows an example system whereby a digital reference signal generator is used by, for example, storing a reference signal in memory, according to embodiments of the present disclosure.

FIG. 4B shows another example system whereby a digital reference signal generator is used by, for example, storing a reference signal in memory. A reflected waveform 302 is mixed in a mixer 305 with an unmodulated stepped frequency source 301. The resulting beat signal 315 is then digitized in a digitizer 415, before being sent to a digital signal processor 430. Simultaneously, a digital reference signal 435 is sent to the digital signal processor 430.

Figure 5:
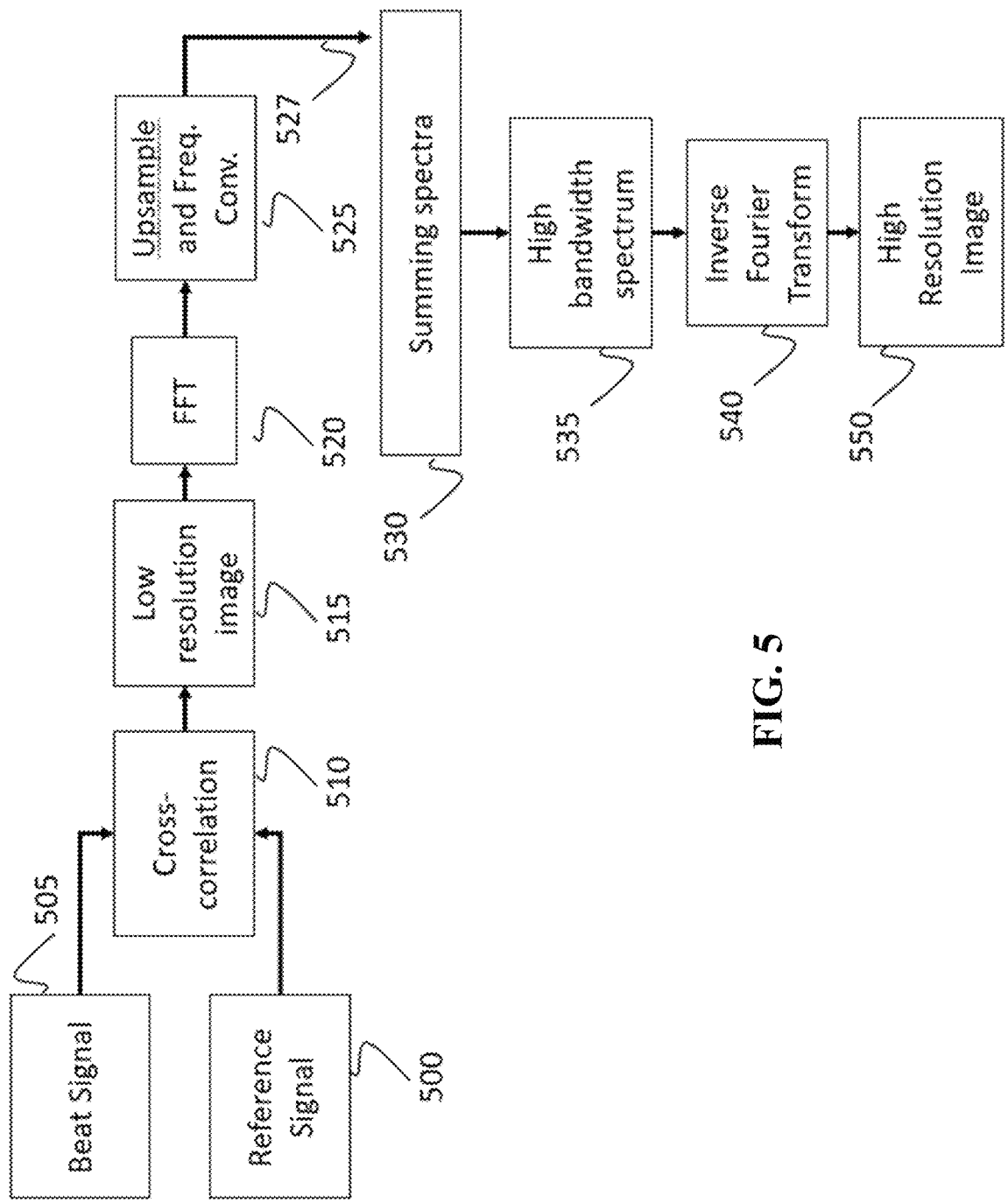
FIG. 5 shows a schematic of the reconstruction of an image of the target from a set of reflection signals and reference signals, according to embodiments of the present disclosure.

FIG. 5 shows an example for reconstructing a high resolution target image from a set of low resolution beat signals with corresponding reference signals. A beat signal 505 and a reference signal 500 are used to calculate a cross correlation 510, resulting in a low resolution image 515. A Fourier transform such as a fast Fourier transform (FFT) 520 is then used to generate a low bandwidth spectrum of the target image. The image spectrum is then upsampled and frequency converted to create a single stepped frequency component of the total spectrum 527. The component spectra 527 are then summed 530 to produce a high bandwidth spectrum 535, before an inverse Fourier transform 540 is used to create a high resolution image 550.

Figure 6A:
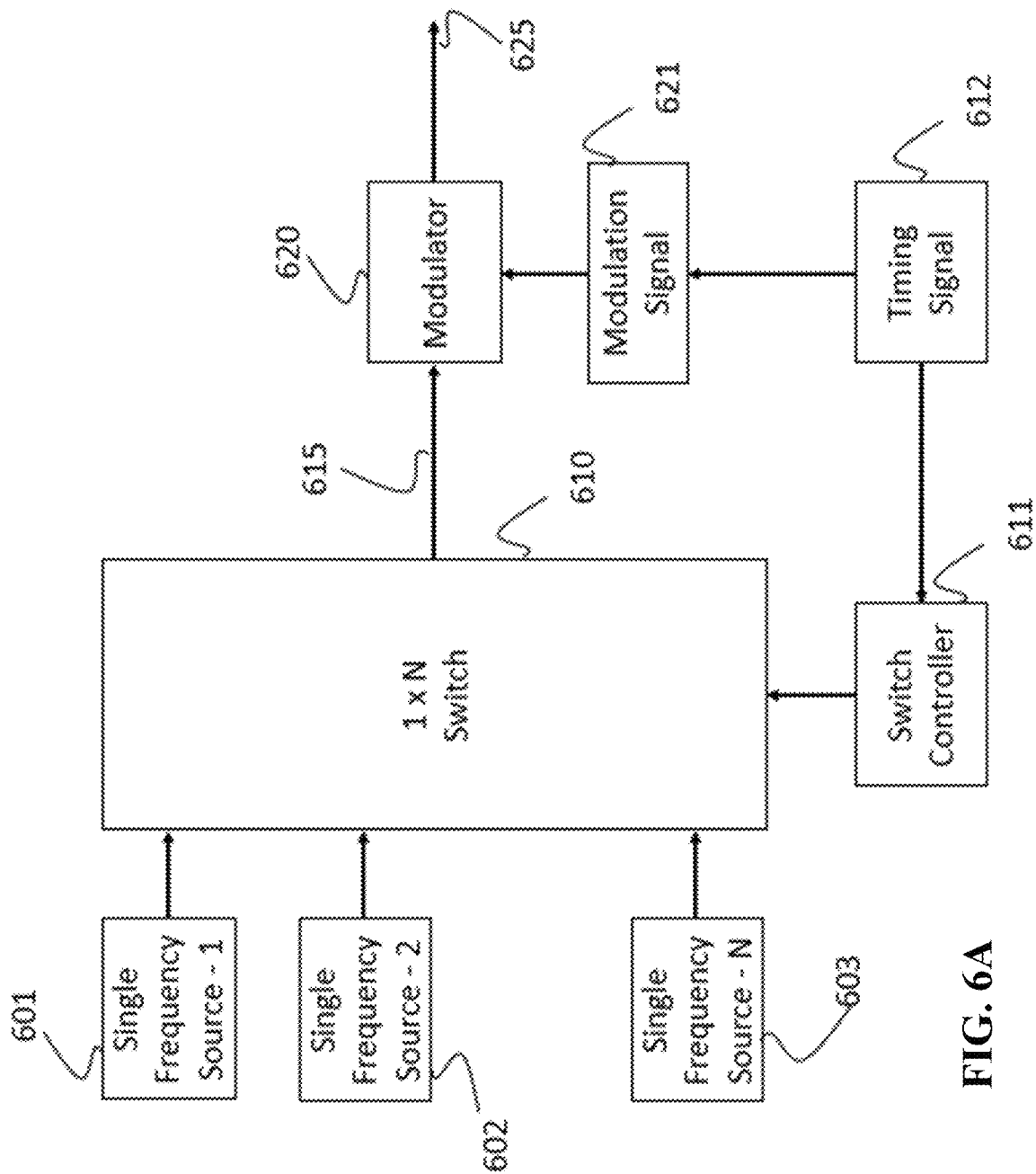
FIG. 6A shows an example architecture of a stepped frequency source with modulation, according to embodiments of the present disclosure.

FIG. 6A shows an example architecture of a stepped frequency source with modulation. A set of N single frequency carriers 601, 602, and 603, are switched with a 1×N switch 610 that is configured to produce an output with stepped frequency 615. The switch is controlled by a switch controller 611, which uses switch timing provided by a timing signal 612. The stepped frequency source 615 is modulated by a modulator 620, which modulates according to a modulation signal 621 to produce a modulated waveform 625. The modulation signal 621 has timing which is also synchronized to that of the timing signal 612.

Figure 6B:
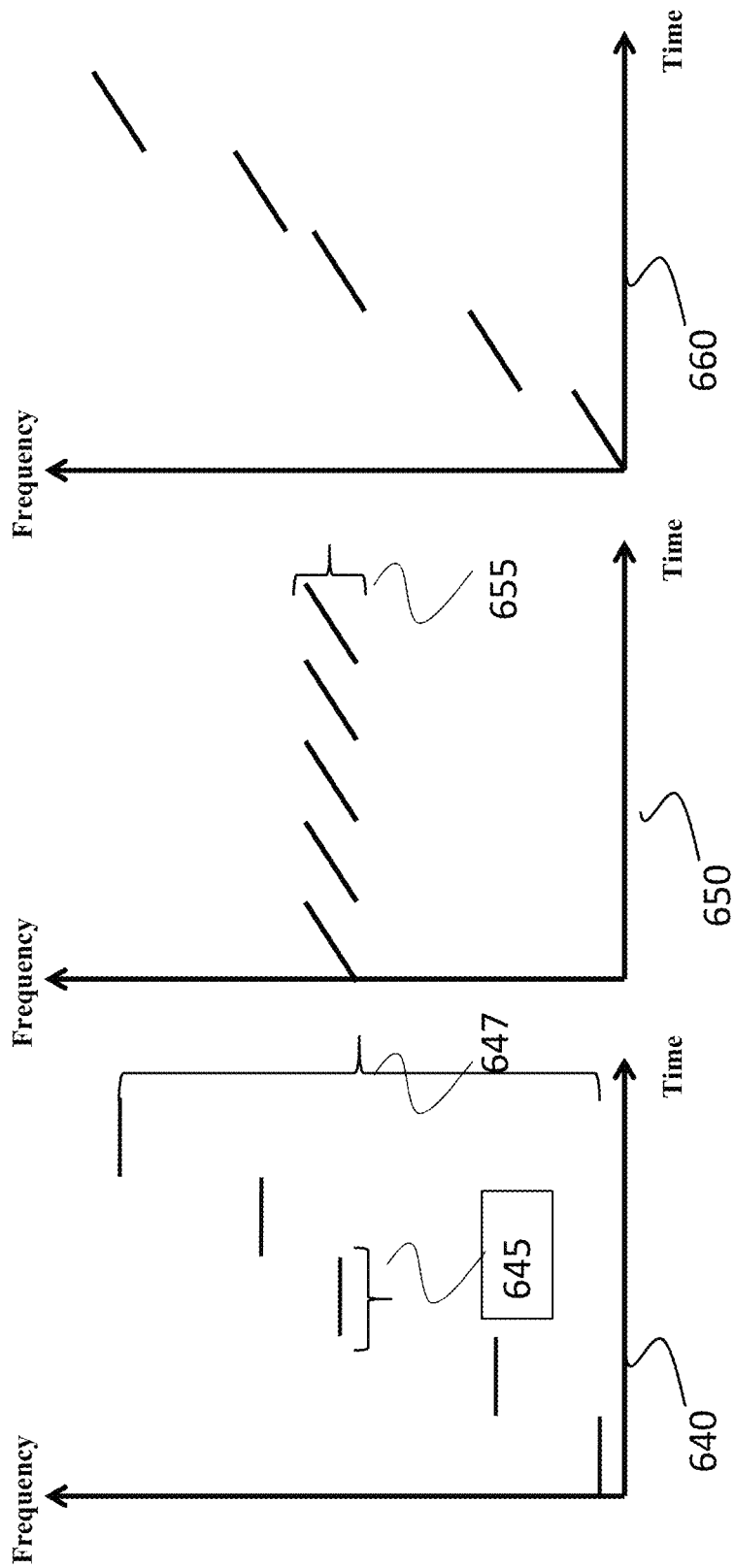
FIG. 6B shows an example of the procedure whereby modulation is applied to a stepped frequency unmodulated source, according to embodiments of the present disclosure.

FIG. 6B shows an example of the procedure whereby modulation is applied to a stepped frequency unmodulated source. An initial stepped frequency source is shown in 640. A set of single frequency sources is used, with the instantaneous frequencies being constant for some period of time 645. In this case the effective occupancy of the total bandwidth 647 is close to zero. 650 shows the modulation signal which is to be applied to the stepped frequency. The modulation signal covers a fixed bandwidth 655, and repeats with the same period as the stepped source frequency shifting 645. In this case, the bandwidth is fully occupied, but limited to only the modulation bandwidth. In 650, the instantaneous frequency is constantly changing. 660 shows a schematic of the modulated stepped frequency waveform. Each component of the stepped frequency source is modulated to achieve some increased bandwidth 645, while the total bandwidth of the modulated stepped frequency source is partially occupied with some non-zero sparsity.

Figure 7:
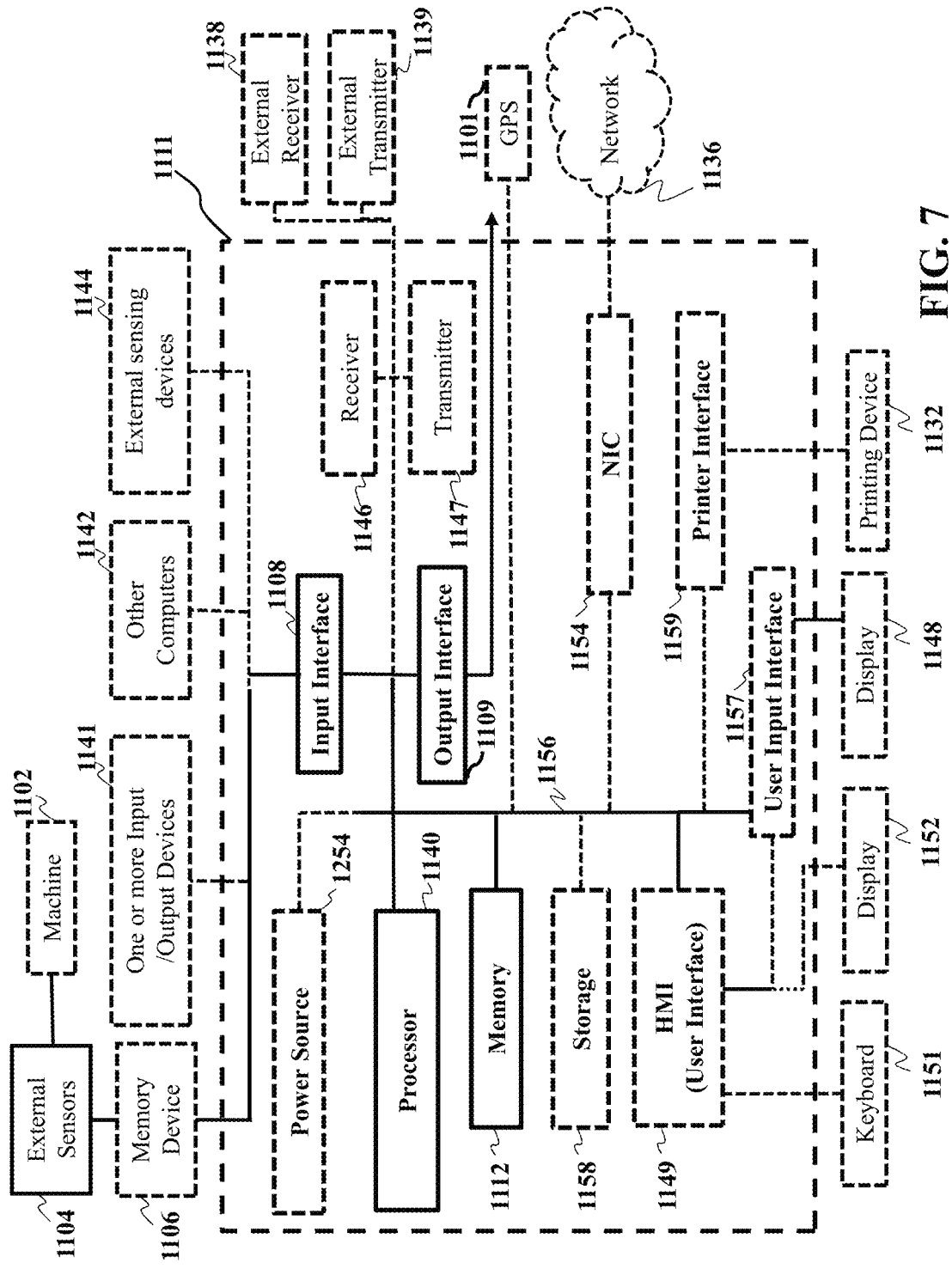
FIG. 7 is a block diagram of a system incorporating system, according to embodiments of the present disclosure.

FIG. 7 is a block diagram of a system incorporating the digital signal processor (system) 195 of FIG. 1D, that can be implemented using an alternate computer or hardware processor, according to embodiments of the present disclosure. The computer 1111 includes a hardware processor 1140, a computer readable memory 1112, storage 1158 and user interface 1149 with display 1152 and keyboard 1151, which are connected through bus 1156. The computer readable memory 1112 stores image reconstruction algorithms for generating the target image 155. The processor 1114 is configured to, in connection with the computer readable memory 1112, generate target images using signals provided via the interface. When referring FIG. 1A, the interface 145 has received the signals from the mixer 140 that mixed the reflected signal 135 and the unmodulated stepped-frequency waveform 125 in the mixer 140.

For example, the user interface 1164 in communication with the hardware processor 1140 and the computer readable memory 1112, acquires and stores the signal data examples in the computer readable memory 1112 upon receiving an input from a surface, keyboard surface 1164, of the user interface 1164 by a user.

The computer 1111 can include a power source 1154, depending upon the application the power source 1154 may be optionally located outside of the computer 1111. Linked through bus 1156 can be a user input interface 1157 adapted to connect to a display device 1148, wherein the display device 1148 can include a computer monitor, camera, television, projector, or mobile device, among others. A printer interface 1159 can also be connected through bus 1156 and adapted to connect to a printing device 1132, wherein the printing device 1132 can include a liquid inkjet printer, solid ink printer, large-scale commercial printer, thermal printer, UV printer, or dye-sublimation printer, among others. A network interface controller (NIC) 1134 is adapted to connect through the bus 1156 to a network 1136, wherein time series data or other data, among other things, can be rendered on a third-party display device, third-party imaging device, and/or third-party printing device outside of the computer 1111.

Still referring to FIG. 7, the signal data or other data, among other things, can be transmitted over a communication channel of the network 1136, and/or stored within the storage system 1158 for storage and/or further processing. Contemplated is that the signal data could be initially stored in an external memory and later acquired by the hardware processor to be processed or store the signal data in the hardware processor's memory to be processed at some later time. The hardware processor memory includes stored executable programs executable by the hardware processor or a computer for performing the resilient restoration systems/methods, power distribution system operation data, and historical power distribution system data of the same type as the power distribution system and other data relating to the resilient restoration of the power distribution system or similar types of power distribution system s as the power distribution system.

Further, the signal data or other data may be received wirelessly or hard wired from a receiver 1146 (or external receiver 1138) or transmitted via a transmitter 1147 (or external transmitter 1139) wirelessly or hard wired, the receiver 1146 and transmitter 1147 are both connected through the bus 1156. The computer 1111 may be connected via an input interface 1108 to external sensing devices 1144 and external input/output devices 1141. For example, the external sensing devices 1144 may include sensors gathering data before-during-after of the collected signal data of the power distribution system. For instance, the disaster induced faulted line segments, and faulted types, and the fault impacted customers. The computer 1111 may be connected to other external computers 1142. An output interface 1109 may be used to output the processed data from the hardware processor 1140. It is noted that a user interface 1149 in communication with the hardware processor 1140 and the non-transitory computer readable storage medium 1112, acquires and stores the region data in the non-transitory computer readable storage medium 1112 upon receiving an input from a surface 1152 of the user interface 1149 by a user.

Figure 8B:
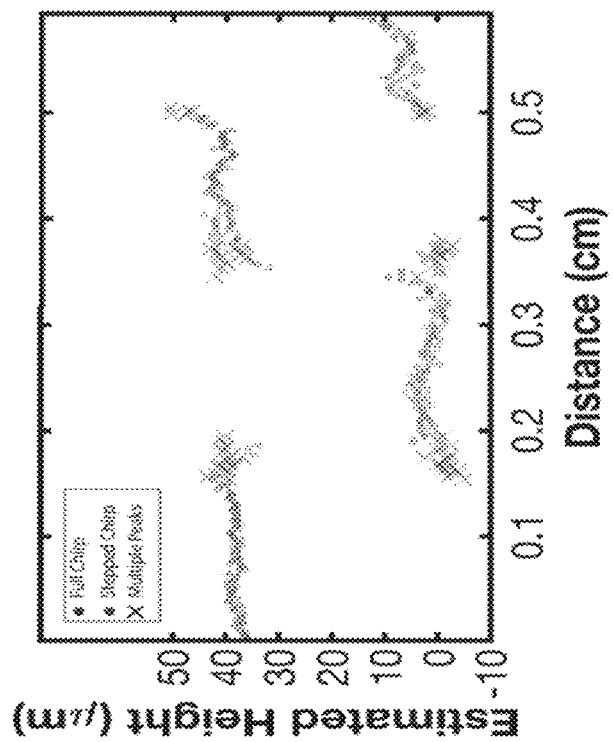
FIG. 8B shows a reconstruction result using Fourier Transform based processing followed by basic peak detection, according to embodiments of the present disclosure.
Figure 8A:
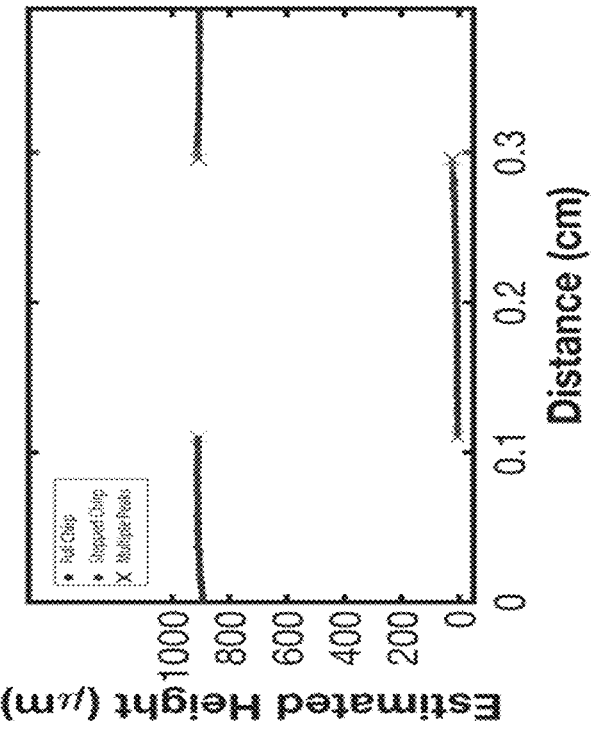
FIG. 8A is an example of experimental reconstruction results of a test metallic sample, according to embodiments of the present disclosure.

FIG. 8A is an example of experimental reconstruction results of a test metallic sample using Fourier Transform based processing followed by basic peak detection using 3 dB thresholding (based on max peak), for a full-chirp (i.e. conventional FMCW), stepped chirp (i.e. spectrally sparse FMCW) and multiple peaks cases. The crosses indicate more than one peak detected and their corresponding locations (test pattern/morphological pattern) of the test metallic sample. The standard deviation is 1.3 µm, and imaging parameters are 400 MHz sampling rate, scanning roughly from 1580 nm to 1610 nm, the chirp rate of 8.398 e16 Hz/s, chirp bandwidth of 15 GHz, reconstruction resolution of 1.8 um, 64 frequencies. This figure clearly indicates that for spatially sparse targets such as the one measured, that spectrally sparse illumination can achieve performance which is identical to that of conventional FMCW based OCT. Good accuracy is attained, while the system shows the ability to detect multiple peaks simultaneously with wide (approximately 1 mm) spacing.

FIG. 8B shows a reconstruction result using Fourier Transform based processing followed by basic peak detection using 3 dB thresholding (based on max peak), with identical parameters to those described for FIG. 8A. This figure illustrates that the proposed spectrally sparse illumination system can achieve equal on-axis resolution to that of conventional FMCW OCT for spatially sparse targets such as the one shown here. Multiple reflections are clearly detected with approximately 40 micron spacing, and spectrally sparse OCT shows negligible performance penalty when compared with FMCW OCT.

As shown, a coherent optical sensing system with sparse illumination is suitable for spatially sparse targets. It shows that the performance is comparable to the conventional optical coherence tomography (OCT), while constraints on optical source performance, and therefore source cost, can be greatly reduced.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A method for a target image reconstruction, comprising:
   emitting stepped frequency waveforms having different constant frequencies at different periods of time;
   modulating the stepped frequency waveforms into frequency ranges each having a first frequency and a second frequency, wherein each of the stepped frequency waveforms is increased from the first frequency to the second frequency based on a range function, wherein the modulated stepped frequency waveforms have a sparsity factor, wherein the sparsity factor is defined as a number of wavelengths multiplied by a bandwidth per wavelength, divided by a total measurement bandwidth, wherein the sparsity factor is determined so as to be less than 1;
   transmitting the modulated stepped frequency waveforms continuously to a target and accepting reflection of the modulated stepped frequency waveforms reflected from the target;
   interfering the modulated stepped frequency waveforms and the reflection of the modulated stepped frequency waveforms to produce beat signals of interferences between the modulated stepped frequency waveforms and the reflection of the modulated stepped frequency waveforms; and
   reconstructing an image of the target from the beat signals.

2. The method of claim 1, wherein the reconstructing comprises:
   using a low-bandwidth measurement from each step frequency of the unmodulated waveform to produce a set of low-bandwidth measurements;
   increasing the sampling rate of each of the set of low-bandwidth measurements by zero padding in the frequency domain to produce a set of oversampled measurements;
   applying frequency shifts to each of the low-bandwidth measurements corresponding to their relative optical frequencies, to produce a set of frequency shifted measurements;
   summing the frequency shifted measurements to produce a single high-bandwidth measurement; and
   transforming the high-bandwidth measurement with a Fourier transform to produce a target image, wherein a resolution of the target image is greater than resolution of each of the low-resolution images.

3. The method of claim 1, further comprising:
   generating a reference signal indicative of interference of the unmodulated step frequency waveform and the modulated step frequency waveform; and
   reconstructing the target image using the beat signal and the reference signal.

4. The method of claim 3, wherein the reconstructing comprises:
   cross-correlating the beat signal and the reference signal in a frequency domain for each constant frequency of the unmodulated step frequency waveform to produce correlation signals, such that there is one correlation signal for each constant frequency;
   combining the correlation signals in the frequency domain in an order of their respective frequencies to produce a frequency image of the target in the frequency domain; and
   transforming the frequency image using a Fourier transform to produce the target image.

5. The method of claim 1, wherein the interfering is performed in a digital domain.

6. The method of claim 1, wherein the range function is a linear function as a function of time.

7. A system for a target image reconstruction, comprising:
   a stepped frequency transmitter configured to emit stepped frequency waveforms having different constant frequencies at different periods of time;
   a modulator configured to modulate the stepped frequency waveforms-into frequency ranges, each of the stepped frequency waveforms-having a first frequency and a second frequency, wherein each of the stepped frequency waveforms¬is increased from the first frequency to the second frequency based on a range function, wherein the arrangement of the modulated stepped frequency waveforms has a sparsity factor, wherein the sparsity factor is defined as a number of wavelengths multiplied by a bandwidth per wavelength, divided by a total measurement bandwidth, wherein the sparsity factor is determined so as to be less than 1;
   a lens or antenna configured to transmit the modulated stepped frequency waveforms continuously to a target and accepting reflection of the modulated stepped frequency waveforms reflected from the target;
   a mixer configured to interfere the modulated stepped frequency waveforms and the reflection of the modulated stepped frequency waveforms to produce beat signals of interferences between the modulated stepped frequency waveforms and the reflection of the modulated stepped frequency waveforms; and
   a signal processor configured to reconstruct an image of the target from the beat signals.

8. The system of claim 7, wherein the signal processor performs steps of:
   using a low-bandwidth measurement from each step frequency of the unmodulated waveform to produce a set of low-bandwidth measurements;

increasing the sampling rate of each of the set of low-bandwidth measurements by zero padding in the frequency domain to produce a set of oversampled measurements;

applying frequency shifts to each of the low-bandwidth measurements corresponding to their relative optical frequencies, to produce a set of frequency shifted measurements;

summing the frequency shifted measurements to produce a single high-bandwidth measurement; and transforming the high-bandwidth measurement with a Fourier transform to produce a target image, wherein a resolution of the target image is greater than resolution of each of the low-resolution images.

9. The system of claim 7, wherein the signal processor further performs steps of:

generating a reference signal indicative of interference of the unmodulated step frequency waveform and the modulated step frequency waveform; and reconstructing the target image using the beat signal and the reference signal.

10. The system of claim 9, wherein the reconstructing comprises:

cross-correlating the beat signal and the reference signal in a frequency domain for each constant frequency of the unmodulated step frequency waveform to produce correlation signals, such that there is one correlation signal for each constant frequency;

combining the correlation signals in the frequency domain in an order of their respective frequencies to produce a frequency image of the target in the frequency domain; and transforming the frequency image using a Fourier transform to produce the target image.

11. The system of claim 7, wherein the interfering is performed in a digital domain.

12. The system of claim 7, wherein the range function is a linear function as a function of time.

* * * * *